US010890657B2

(12) United States Patent
Butts et al.

(10) Patent No.: US 10,890,657 B2
(45) Date of Patent: Jan. 12, 2021

(54) ADS-B TRANSPONDER SYSTEM AND METHOD

(71) Applicant: Appareo Systems, LLC, Fargo, ND (US)

(72) Inventors: Nicholas L. Butts, West Fargo, ND (US); Robert M. Allen, Reiles Acres, ND (US); Bradley R. Thurow, Fargo, ND (US); Greg S. Middlestead, West Fargo, ND (US)

(73) Assignee: Appareo Systems, LLC, Fargo, ND (US)

(*) Notice: Subject to any disclaimer, the term of this patent is extended or adjusted under 35 U.S.C. 154(b) by 182 days.

(21) Appl. No.: 16/101,101

(22) Filed: Aug. 10, 2018

(65) Prior Publication Data

US 2019/0049576 A1 Feb. 14, 2019

Related U.S. Application Data

(60) Provisional application No. 62/543,737, filed on Aug. 10, 2017.

(51) Int. Cl.
*G01S 13/91* (2006.01)
*G08G 5/00* (2006.01)
(Continued)

(52) U.S. Cl.
CPC ............ *G01S 13/91* (2013.01); *G01S 13/765* (2013.01); *G01S 13/782* (2013.01);
(Continued)

(58) Field of Classification Search
CPC ........ G01S 13/91; G01S 13/93; G01S 13/781; G01S 13/765; G01S 13/767;
(Continued)

(56) References Cited

U.S. PATENT DOCUMENTS 6,222,480 B1 * 4/2001 Kuntman .............. G01S 13/933
342/30
10,102,760 B1 10/2018 Foltan et al.
(Continued)

FOREIGN PATENT DOCUMENTS

CN 106452549 * 2/2017 ............... H04B 7/08

OTHER PUBLICATIONS

"International Search Report and Written Opinion; PCT/US18/46301; dated Oct. 22, 2018".

*Primary Examiner* — Erin F Heard
*Assistant Examiner* — Michael W Justice
(74) *Attorney, Agent, or Firm* — Hovey Williams LLP

(57) ABSTRACT

An ADS-B transponder system is associated with a vehicle including a transponder. The system includes a universal access transceiver (UAT) subsystem configured for detecting and responding to an interrogation signal by broadcasting a signal representing a vehicle parameter. The interrogation signal can be detected by monitoring current fluctuations in a power bus on the vehicle. The UAT subsystem is connected to a smart antenna configured for transmitting and receiving ADS-B signals. In an aircraft (A/C) application the vehicle parameter can comprise squawk code, altitude, heading vector, airspeed and other flight data.

6 Claims, 6 Drawing Sheets

(51) Int. Cl.
 *G01S 13/76* (2006.01)
 *G01S 13/78* (2006.01)
(52) U.S. Cl.
 CPC ......... *G08G 5/0013* (2013.01); *G08G 5/0017* (2013.01); *G08G 5/0021* (2013.01)
(58) Field of Classification Search
 CPC ...... G01S 13/9303; G01S 19/03; G01S 19/14; G08G 5/0008; G08G 5/04; H01Q 1/28; H04W 4/02
 USPC ......... 342/29, 357.4, 36; 455/456.3; 71/301; 701/301
 See application file for complete search history.

(56) References Cited

U.S. PATENT DOCUMENTS

| | | | |
|---|---|---|---|
| 10,211,914 B2 | 2/2019 | Stayton | |
| 10,370,102 B2 | 8/2019 | Boykin et al. | |
| 2003/0233192 A1 | 12/2003 | Bayh et al. | |
| 2004/0224740 A1 | 11/2004 | Ball et al. | |
| 2005/0114627 A1 | 5/2005 | Budny et al. | |
| 2005/0156777 A1 | 7/2005 | King et al. | |
| 2005/0220055 A1 | 10/2005 | Nelson et al. | |
| 2005/0246353 A1 | 11/2005 | Ezer et al. | |
| 2006/0057974 A1 | 3/2006 | Ziarno et al. | |
| 2006/0176651 A1 | 8/2006 | Olzak | |
| 2006/0216674 A1 | 9/2006 | Baranov et al. | |
| 2006/0227995 A1 | 10/2006 | Spatharis | |
| 2007/0020588 A1 | 1/2007 | Batcheller et al. | |
| 2007/0100516 A1 | 5/2007 | Olzak | |
| 2007/0142980 A1 | 6/2007 | Ausman et al. | |
| 2007/0241936 A1 | 10/2007 | Arthur et al. | |
| 2008/0254750 A1 | 10/2008 | Whitaker Filho | |
| 2008/0261638 A1 | 10/2008 | Wahab et al. | |
| 2009/0147758 A1 | 6/2009 | Kumar | |
| 2009/0248287 A1 | 10/2009 | Limbaugh et al. | |
| 2010/0092926 A1 | 4/2010 | Fabling | |
| 2010/0149329 A1 | 6/2010 | Maguire | |
| 2010/0231706 A1 | 9/2010 | Maguire | |
| 2011/0298649 A1* | 12/2011 | Robin | G01S 13/785 342/30 |
| 2012/0001788 A1 | 1/2012 | Carlson et al. | |
| 2012/0215505 A1 | 8/2012 | Srivastev et al. | |
| 2012/0299752 A1 | 11/2012 | Mahmoud et al. | |
| 2013/0093612 A1 | 4/2013 | Pschierer et al. | |
| 2013/0121219 A1* | 5/2013 | Stayton | H04B 7/26 370/310 |
| 2013/0137415 A1 | 5/2013 | Takikawa | |
| 2013/0171964 A1 | 7/2013 | Bhatia et al. | |
| 2013/0201037 A1 | 8/2013 | Glover et al. | |
| 2014/0024395 A1 | 1/2014 | Johnson et al. | |
| 2014/0081483 A1* | 3/2014 | Weinmann | G08G 5/0021 701/14 |
| 2014/0303813 A1 | 10/2014 | Ihns | |
| 2015/0083674 A1 | 3/2015 | Sarno et al. | |
| 2015/0349875 A1 | 12/2015 | Lauer et al. | |
| 2015/0364044 A1 | 12/2015 | Kashi et al. | |
| 2016/0170025 A1* | 6/2016 | Johnson | H01Q 21/28 342/357.4 |
| 2016/0202950 A1 | 7/2016 | Hawley | |
| 2016/0301439 A1 | 10/2016 | Brinkley | |
| 2016/0347473 A1 | 12/2016 | Khatwa et al. | |
| 2016/0349361 A1* | 12/2016 | Schulte | G01S 13/74 |
| 2016/0363652 A1 | 12/2016 | Hamminga et al. | |
| 2016/0379640 A1 | 12/2016 | Joshi et al. | |
| 2017/0036776 A1 | 2/2017 | He | |
| 2017/0106997 A1 | 4/2017 | Bekanich | |
| 2017/0213552 A1 | 7/2017 | Gupta | |
| 2017/0299685 A1* | 10/2017 | McCullen | H01Q 1/28 |
| 2018/0044034 A1 | 2/2018 | Newman et al. | |

* cited by examiner

ADS-B TRANSPONDER SYSTEM AND METHOD

CROSS-REFERENCE TO RELATED APPLICATION

This application claims priority in U.S. Provisional Patent Application No. 62/543,737, filed Aug. 10, 2017, which is incorporated herein by reference.

BACKGROUND OF THE INVENTION

1. Field of the Invention

The present invention relates generally to vehicle control systems, including 978 MHz Universal Access Transceiver (UAT) transponders for aircraft (or A/C) that require a 1090 MHz Mode A/C transponder and methods of use thereof, and more specifically to transponder systems and methods complying with Automatic Dependent Surveillance-Broadcast (ADS-B) regulations promulgated by the Federal Aviation Administration (FAA). The present invention further contemplates applications in ground and marine vehicles. For example, the present invention accommodates coordinated control of A/C and ground support vehicles at air terminals, airports, maintenance facilities, air bases, etc.

2. Description of the Related Art

The FAA, under its authority over American civil aviation, has mandated implementation of ADS-B by Jan. 1, 2020 for most civilian aircraft (A/C). ADS-B is the implementation of the FAA's Next Generation Air Transportation System, or "NextGen," a system designed to replace the aging and functionally limited radar-based system currently used by air traffic controllers (ATCs) to track A/C in controlled airspace.

ADS-B is an aircraft and satellite-based transmission system. It performs the functions of ADS-B Out and ADS-B In. An aircraft with ADS-B Out transmits its position and velocity to other aircraft and ATC ground stations using an ADS-B modified Mode S transponder or a universal access transceiver (UAT). An aircraft with ADS-B In can receive information from other aircraft transmitting ADS-B information, and can also receive traffic and weather information. Aircraft positions can be determined using technologies such as a global navigation satellite system (GNSS), e.g., the U.S. based Global Positioning System (GPS).

When contacting ATC for ground clearance, a pilot is given a 4-digit "squawk code." Each digit can be valued from 0-7 inclusive. This squawk code must be input to the 978 MHz UAT ("978 UAT") transponder. This process usually requires a user interface with an operator aboard the aircraft. An aircraft that has a 978 UAT transponder is required to have a 1090 MHz mode aircraft ("1090 Mode A/C") transponder transmit the squawk code and an encoded altitude when it receives an interrogation request from ATC. The collected information is sent back to ATC where it is then used to create an accurate, current radar image. The 978 UAT transponder also sends the squawk code, unique aircraft ID, GNSS position, heading, airspeed and altitude. Retrieving this data requires a data link between the 978 UAT ADS-B system and the 1090 Mode A/C transponder. Many transponders currently do not support this data link as they pre-date the ADS-B system and are often from different manufacturers. What is generally common to A/C transponders is an antenna link whereby data can be transmitted upon interrogation.

Data that can be handled by the system 2 embodying the present invention is virtually unlimited. For example, in A/C applications, such data can include other operating parameters, such as airspeed, ground speed, commercial flight number, flight plan, load information, fuel status, emergency advisories, service needs, etc.

Currently, there are three common ways for the squawk code to be translated: 1) by picking up the 1090 transmission over-the-air by means of an antenna; 2) by capturing leakage from the aircraft's 1090 transponder coax cable; and 3) by manually entering the code into the 1090 transponder and the 978 transponder. Heretofore there has not been available a transponder system with the advantages and features of the present invention, which provides owners and operators of such aircraft with a relatively simple solution for a transponder system that will meet the requirements of the FAA-mandated, ADS-B regulations.

BRIEF SUMMARY OF THE INVENTION

The present invention can be configured for providing a squawk code, which is entered into the 1090 transponder. The 978 transponder then picks up the ATC response and uses it as the squawk code. The preferred device is a 978 UAT transponder which minimizes or eliminates the need for user input. A GNSS antenna can be mounted on the top of the A/C and a UAT "smart" antenna with associated electronics can be located on the bottom of the A/C. A 1030 MHz ATC transmitter interrogates the transponder, which responds at 1090 MHz.

The transponder can use conducted emissions to pick up the squawk code from the 1090 mode A/C transponder in the A/C. Specifically, the device will pick up emissions from the input power lines, which signals are input to a 1090 MHz demodulator. The demodulator converts the 1090 MHz pulse position modulation to a digital signal that represents the squawk code. This squawk code is transmitted as part of the 978 MHz UAT signal.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the A/C direction of travel. Said terminology will include the words specifically mentioned, derivatives thereof and words of similar meaning.

II. Preferred Embodiment ADS-B Transponder System 2

Figure 1:
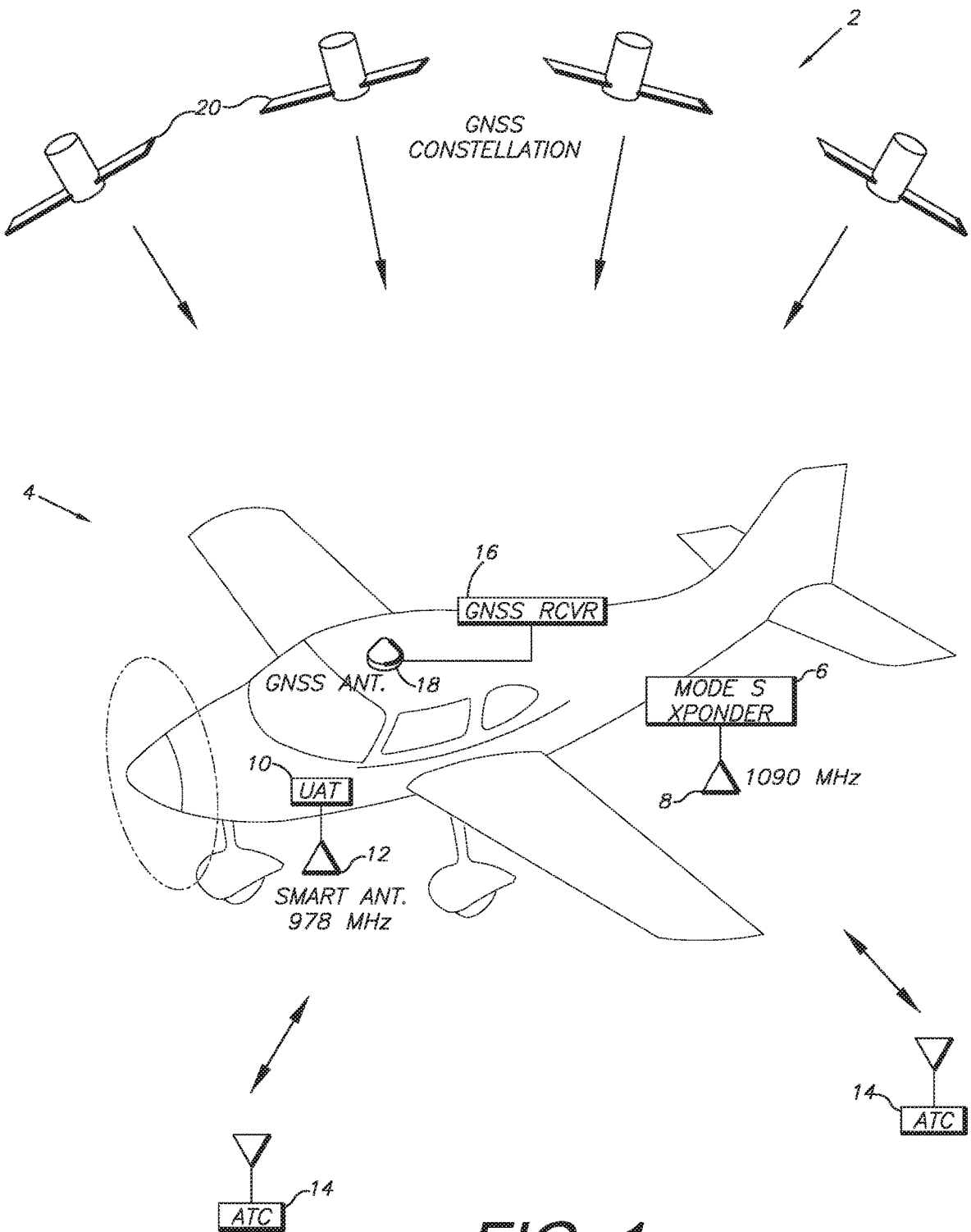
FIG. 1 is a perspective view of an aircraft, generally showing the components of an ADS-B transponder system embodying an aspect of the present invention.

FIG. 1 shows an ADS-B transponder system 2 embodying a preferred aspect of the present invention in and aircraft (A/C) 4, which can be equipped with a mode S transponder 6 connected to a 1090 MHz antenna 8. The system 2 includes a universal access transceiver (UAT) 10 connected to a 978 MHz "smart" antenna 12. The preferred device uses UAT technology which could be applied to such a smart antenna or a standard UAT transceiver to determine if an incoming interrogation from an air terminal control (ATC) 14 or A/C 4 is requesting the interrogated A/C's squawk code or altitude code. Once determined, the system 2 sends back a response without the need for a user interface.

The system 2 includes a global navigation satellite system (GNSS) receiver 16 connected to one or more GNSS antennae 18 positioned atop the A/C 4 for optimizing perception of positioning signals from a GNSS constellation of satellites 20. In the United States the predominant GNSS system is known as the global positioning system (GPS), which is maintained and operated by and for U.S. government departments and agencies, such as the U.S. Air Force. Other GNSS satellite constellations worldwide are maintained and operated by other nations and institutions. Relatively accurate latitude, longitude and altitude (XYZ) positioning can be calculated from unobstructed views of three satellites for positioning (ranging) signals and a fourth satellite for timing signals using well-known triangulation techniques.

Figure 2:
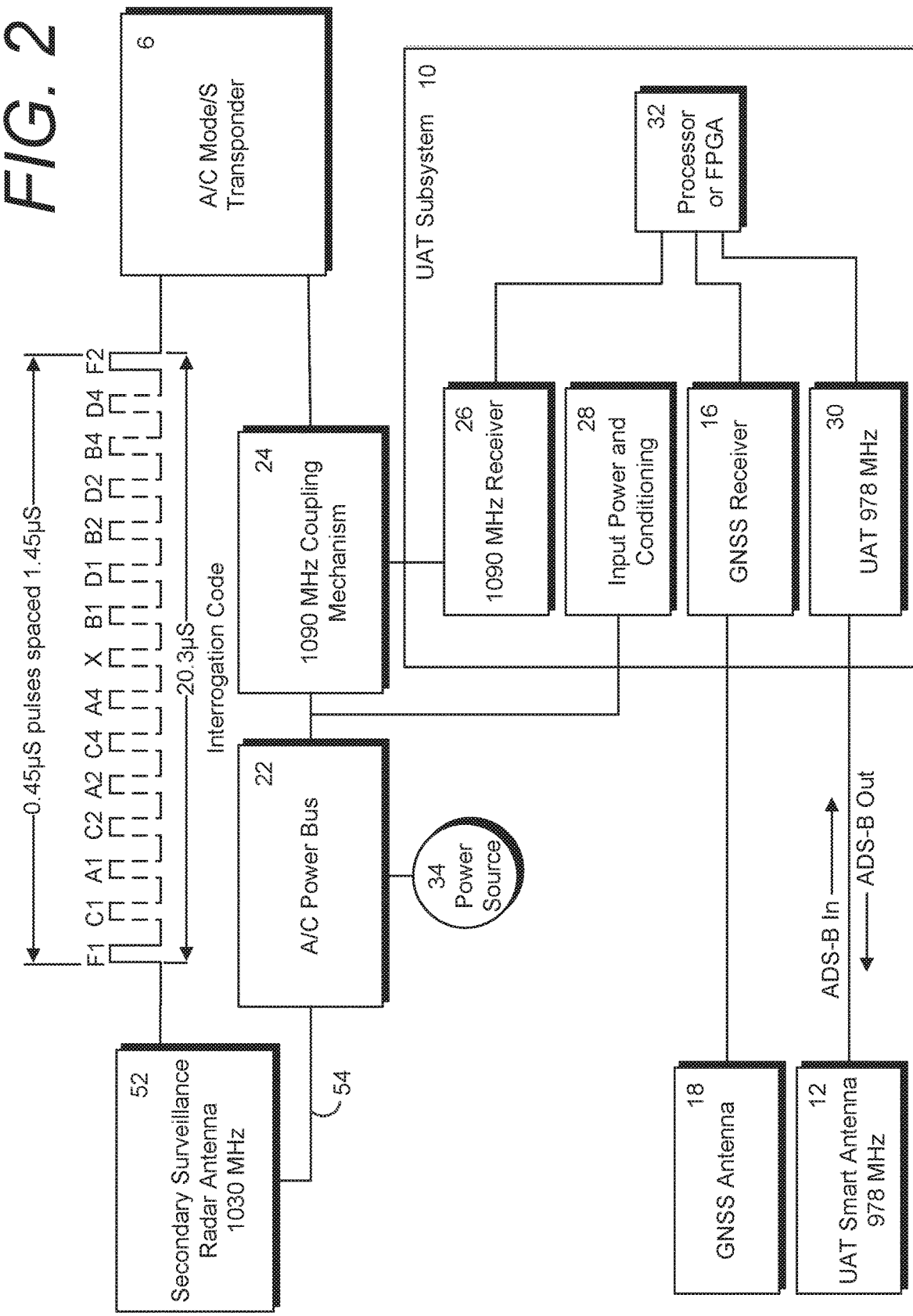
FIG. 2 is a block diagram of the system.

FIG. 2 is a schematic diagram of the ADS-B transponder system 2 configured for mounting in the A/C 4. The system 2 is powered by an onboard A/C power bus 22. Alternatively, standalone power sources, such as batteries, could be provided. A 1090 MHz coupling mechanism 24 connects the power bus 22 to the mode S transponder 6 and the UAT subsystem 10. The UAT subsystem 10 includes a 1090 MHz receiver 26 connected to the coupling mechanism 24 and the 1090 MHz antenna 8. An input power and conditioning component 28 connects to the A/C power bus 22 and conditions (e.g., demodulates) the input power to avoid current spikes and other anomalies. A suitable microprocessor or a field programmable gate array 32 can be connected to the receiver 26, the GNSS receiver 16 and a UAT 978 MHz circuit 30. The UAT subsystem 10 can be pre-programmed to perform various control routines and functions in the system 2.

Figure 3:
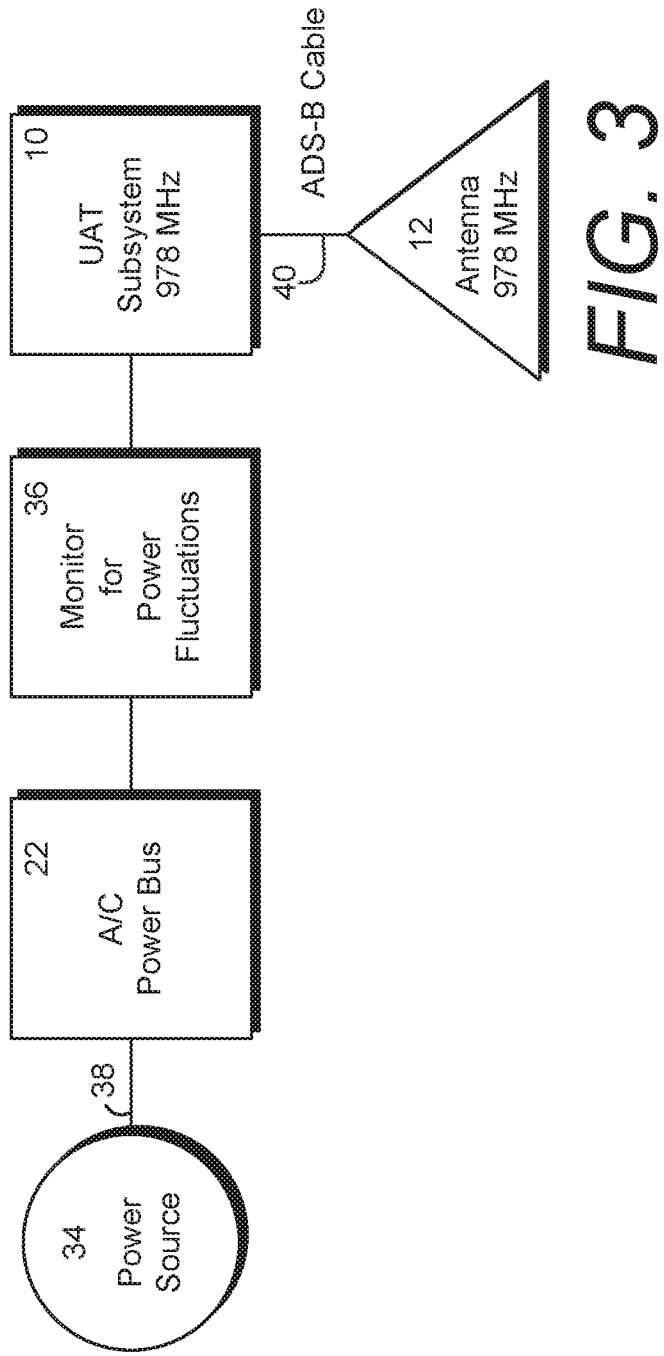
FIG. 3 is a block diagram of an embodiment of the system configured for monitoring conducted emissions.

FIG. 3 is another view of selected components of the system 2, including a power source 34 onboard the A/C 4, which is connected to a power fluctuation monitor 36 by a 12V (DC) power cable 38 via the A/C power bus 22. The monitor 36 connects to the UAT subsystem 10, which is connected to the UAT smart antenna 12 by an ADS-B (e.g., coaxial) cable 40. The UAT smart antenna 12 electronics can include input power conditioning circuitry, a microprocessor or a field programmable gate array (FPGA), a GPS receiver, 1090 MHz signal condition and demodulation circuits and a signal generation trace to trace coupling, which represents the conducted emissions state.

The system 2 of the present invention can be configured to accommodate A/C and other vehicle operations in proximity to surveillance radar (e.g., urban areas), and in rural and other areas remote from surveillance radar. For example, after a predetermined time interval lapses without receiving a squawk code interrogation request, the UAT smart antenna 12 can utilize its 1030 MHz interrogation circuit to transmit an interrogation request. The 1090 A/C transponder 6 would then respond with its squawk code, which can be transmitted along with other pertinent parameters. Such lapses in receiving interrogation codes can occur, for example, when A/C are flying over water, rural areas, etc. The system 2 can thus reduce aircrew distractions and workload by automatically performing multiple transponder functions. Moreover, the system 2 is configurable, e.g. by preprogramming the microprocessor or FPGA, to accommodate a wide range of vehicle operational parameters, equipment-specific data, meteorological information, traffic considerations, etc.

Figure 4:
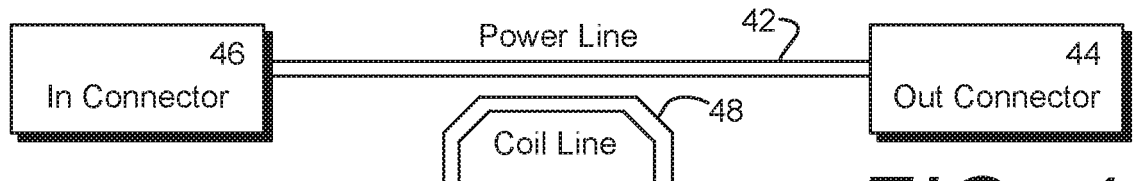
FIG. 4 is an enlarged, fragmentary view particularly showing a subsystem for monitoring and detecting signals emitted from a power line.

FIG. 4 shows a configuration of the UAT smart antenna 12 with a coaxial cable power line 42 extending from a power out connector 44 to a power in connector 46. The power line 42 has the insulation and the outer shield removed. The smart antenna can be configured with the UAT subsystem electronics inside a coil line 48. As shown in FIG. 2, a secondary surveillance radar system 52 can and will send interrogation requests via the 1030 MHz frequency. This signal will be received by the A/C mode S transponder 6, which will respond with either the A/C squawk code or the A/C altitude. The signal transmitted by the transponder 6 is coupled with the A/C power bus 22. The UAT subsystem 10 will utilize a coupling mechanism 24 and a 1090 MHz receive circuit 26 to detect the squawk code or altitude. That data will be fed into the microprocessor or FPGA 32 and used for future transmissions on the UAT 978 MHz circuit 30. In this embodiment the power source can be a battery recharge with an alternator. The A/C power bus 22 and the 1090 MHz coupling mechanism 24 can be monitored for power fluctuations by the system 2. The smart antenna 12 picks up any emissions by a trace to trace coupling, which can be accomplished by wrapping a coil around or near the power line 42, creating the coil line 48, which connects to the Mode S transponder 6.

Figure 5:
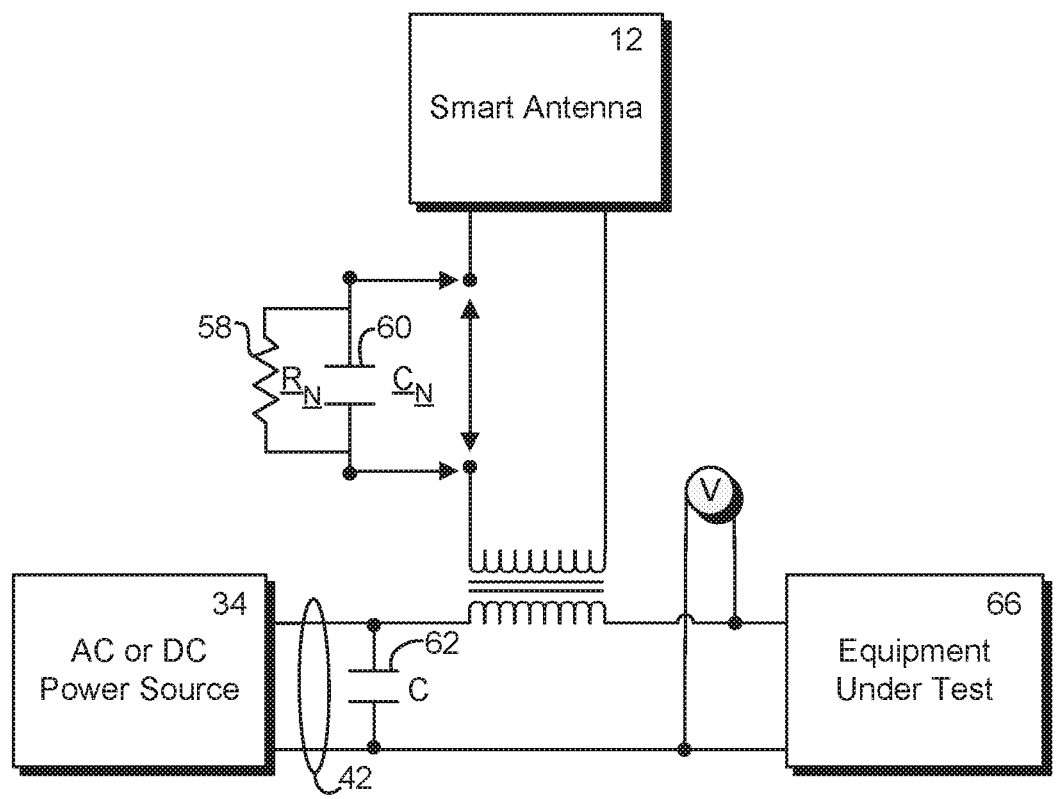
FIG. 5 is a schematic diagram of an interface with a "smart" antenna.

FIG. 5 shows a monitoring and testing subsystem 55, as an alternative to the configuration shown in FIG. 4. Instead of coupling to the power line 42, a transformer 56 is provided between the smart antenna 12 and the power line 42. As shown in FIG. 5, the monitor and testing subsystem 55 can also include a resistor 58, capacitors 60 ($C_N$), 62 (C) and a voltmeter 64. The subsystem 55 is configured to monitor voltage swings, spikes, power fluctuations and other system anomalies. Equipment under test 66 can be connected to the power line 42.

By monitoring the power fluctuations, the smart antenna 12 can draw information from the transponder 6 through conducted emissions. Conducted emissions are a form of electronic leakage, which are provided by the frequencies on the power line 42. The 1090 Mode S or Mode A/C transponder 6 receives an interrogation request form the FAA's secondary surveillance radar network via the secondary surveillance radar antenna 52. The 1090 Mode S A/C transponder 6 responds with either the squawk code or aircraft altitude, depending on the interrogation request. The transponder response results in conducted emissions on the power line 42, which the UAT smart antenna 12 picks up, demodulates and stores as data representing a new squawk code or altitude. The smart antenna 10 transmits this data as part of the UAT message.

FIG. 2 shows an example of an interrogation code from the secondary surveillance radar antenna 52 to the mode S transponder 6. Transponder responses are monitored through conducted emissions that are detected on the main power line 42, e.g., in the 1090 MHz range. Each 1090 MHz response is a pulse position modulated signal. For each response there is a framing pulse F1, followed by 13 additional pulses and then bookended with another framing pulse F2. Alternatively, the device can receive the response either through demodulating the 1090 MHz RF signal or the baseband signal.

Figure 6:
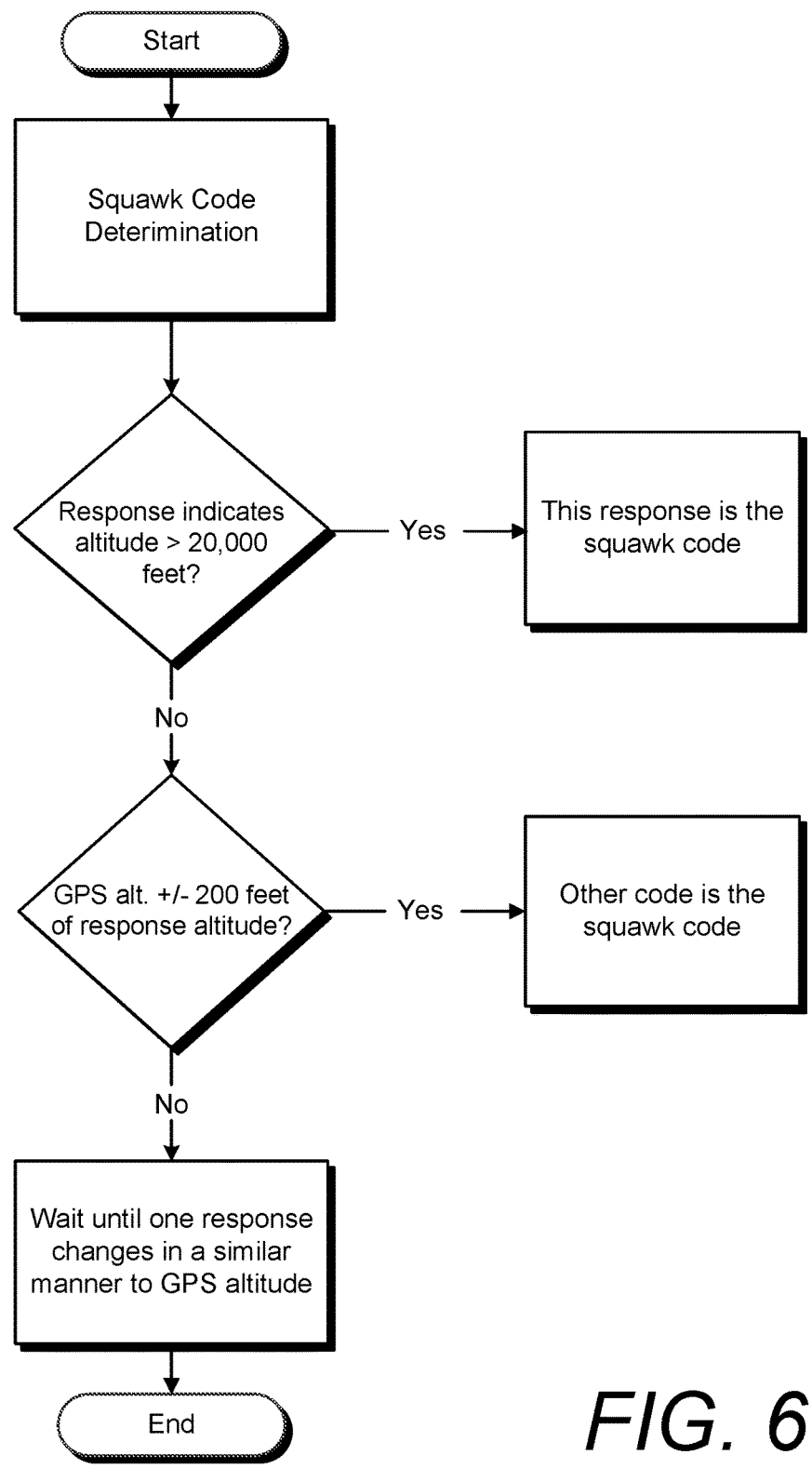
FIG. 6 is a flowchart showing a method of determining a squawk code and a GPS-defined altitude embodying an aspect of the present invention.

FIG. 6 is a flowchart showing an algorithm for determining if a received signal is the A/C's squawk code or altitude information (code). Both the squawk code and the altitude code can use the same modulation scheme, as shown in FIG. 2. Therefore, the system 2 can be programmed to identify the transponder 6 response as squawk or altitude. When the smart antenna 12 receives a response, the system 2 can use this algorithm to determine if the response is seeking a squawk code or not. To aid in decoding the response, the smart antenna 12 uses the A/C altitude determined from received GNSS signals. After receiving the response, the algorithm must first decide if the response indicates that the aircraft's altitude is greater than 20,000 feet. If Yes, the algorithm will know if this is the aircraft's squawk code. If No, the algorithm uses the 1090 transponders response that is closest to the aircraft's GPS altitude, which will be assumed to be the altitude response. In the preferred embodiment, the algorithm looks to see if the onboard GNSS-defined altitude is within 200 feet. In No, the other response is the squawk code. If the altitude is off by more than 200 feet, the device waits until the altitude encoder starts to change position. At that point, the algorithm assumes the changing response is the altitude response and the non-changing response is the squawk code.

Figure 7:
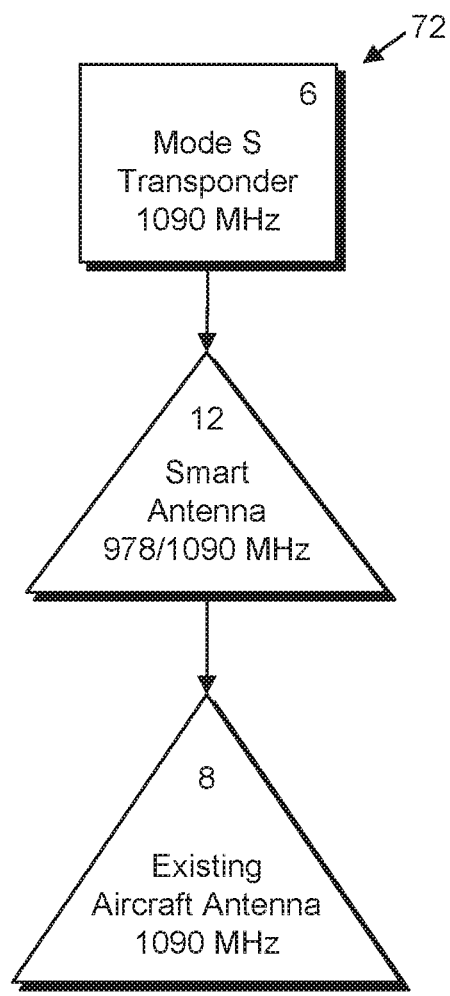
FIG. 7 is a block diagram of a transponder system embodying an alternative aspect of the present invention with a smart antenna connected to a Mode S transponder and a 1090 A/C antenna.

FIG. 7 shows an alternative embodiment 72 of the preferred system with the UAT smart antenna 12 and the 1090 mode S transponder 6 connected together so that the device uses an RF feed-thru on the antenna such that the ADS-B Out device and the ADS-B In could be connected to the antenna to use the signal.

It is to be understood that the invention can be embodied in various forms and is not to be limited to the examples specifically discussed above. The range of components and configurations which can be utilized in the practice of the present invention is virtually unlimited.

Having thus described the invention, what is claimed as new and desired to be secured by Letters Patent is:

1. An Automatic Dependent Surveillance-Broadcast (ADS-B) system for a vehicle including a transponder transmitting on a first radio frequency (RF1), which system comprises:
a universal access transceiver (UAT) subsystem associated with the vehicle and including a programmable device configured for transmitting an output corresponding to a vehicle parameter on a second radio frequency (RF2);
an antenna associated with the vehicle and connected to said UAT subsystem;
said antenna comprising a smart antenna configured for transmitting said vehicle parameter and receiving signals from another vehicle equipped with ADS-B and from an air traffic control (ATC) station;
said ATC station transmits an interrogation code on a third frequency (RF3);
said transponder responds to said interrogation code with a squawk code assigned to said vehicle;
said UAT subsystem programmed for transmitting via said antenna on RF2 a vehicle parameter associated with an ADS-B requirement;
said vehicle includes a power source;
said UAT subsystem utilizes conducted emissions from said power source to detect interrogation code signals and activate said UAT subsystem in response;
an ADS-B Out component connected to said UAT and configured for transmitting said vehicle parameter; and
an ADS-B In component connected to said UAT and configured for receiving vehicle parameters transmitted from another vehicle.

2. The system according to claim 1 wherein said interrogation codes are transmitted by secondary surveillance radar equipment associated with a respective ATC station.

3. The system according to claim 1, which includes:
a power bus connected to said power source and configured for distributing electrical power therefrom;
a monitor located in proximity to said power bus and configured for monitoring power fluctuations therein; and
said UAT subsystem activating in response to said power fluctuations.

4. The system according to claim 1, which includes:
a coil associated with said smart antenna and said vehicle transponder; and
said coil configured for providing a current representative of a conducted emission in a power line connecting the smart antenna and the transponder.

5. The system according to claim 1 wherein said smart antenna includes first and second internal transformers and provides an output activating said UAT subsystem in response to current flow in said smart antenna transformers.

6. The system according claim 1, which includes a fleet of multiple vehicles each including:
an ADS-B Out component transmitting a vehicle parameter; and
an ADS-B In component receiving vehicle parameters transmitted from another vehicle.

* * * * *